(12) United States Patent
Kato

(10) Patent No.: US 7,542,181 B2
(45) Date of Patent: Jun. 2, 2009

(54) IMAGE READING APPARATUS AND COPYING MACHINE EQUIPPED WITH THE SAME

(75) Inventor: Tokunori Kato, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 990 days.

(21) Appl. No.: 10/925,989

(22) Filed: Aug. 26, 2004

(65) Prior Publication Data

US 2005/0078340 A1 Apr. 14, 2005

(30) Foreign Application Priority Data

Aug. 29, 2003 (JP) ............................. 2003-308090

(51) Int. Cl.
H04N 1/04 (2006.01)
(52) U.S. Cl. ...................................... 358/474; 358/496
(58) Field of Classification Search ................. 358/474, 358/475, 471, 478, 488, 487, 496, 494, 498
See application file for complete search history.

(56) References Cited

U.S. PATENT DOCUMENTS

| | | | |
|---|---|---|---|
| 2003/0107784 A1* | 6/2003 | Togashi | 358/528 |
| 2003/0210919 A1* | 11/2003 | Katahira | 399/82 |
| 2003/0231361 A1* | 12/2003 | Kato et al. | 358/501 |
| 2004/0047000 A1* | 3/2004 | Watanabe et al. | 358/1.16 |
| 2004/0190078 A1* | 9/2004 | Lebo et al. | 358/474 |
| 2004/0234311 A1* | 11/2004 | Adams | 399/380 |
| 2007/0009154 A1* | 1/2007 | Iwabayashi et al. | 382/176 |
| 2007/0024902 A1* | 2/2007 | Kato | 358/1.15 |

FOREIGN PATENT DOCUMENTS

| | | |
|---|---|---|
| JP | A 60-2938 | 1/1985 |
| JP | A 62-9369 | 1/1987 |
| JP | A 3-264964 | 11/1991 |
| JP | A 4-153669 | 5/1992 |
| JP | A 5-127450 | 5/1993 |
| JP | A 10-268708 | 10/1998 |
| JP | A 2000-324283 | 11/2000 |

* cited by examiner

Primary Examiner—Jerome Grant, II
(74) Attorney, Agent, or Firm—Oliff & Berridge, PLC

(57) ABSTRACT

An image reading apparatus has a read table on which a source document is mounted, a document cover openably/closably held on the read table, a detection section detecting state of the document cover, a switching section switching between a continuous read mode where the source document is read when the detection section detects a closed state of the document cover after detecting an opened state and an ordinary read mode where the source document is read according to an instruction by a user regardless of the state of the document cover, a timer section measuring elapsed time since switching to the continuous read mode, and a reset section resetting the elapsed time when the detection section detects the closed state in the continuous read mode, wherein the switching section switches from the continuous read mode to the ordinary read mode when the elapsed time reaches a first predetermined time.

5 Claims, 8 Drawing Sheets

IMAGE READING APPARATUS AND COPYING MACHINE EQUIPPED WITH THE SAME

BACKGROUND OF THE INVENTION

1. Field of the Invention

The present invention relates to an image reading apparatus in which operation mistake at the time of reading a document can be prevented, and a copying machine equipped with the image reading apparatus.

2. Description of the Related Art

In a copying machine etc. equipped with an image reading apparatus, image copying has been heretofore made in such a manner that an image formed on a document is read from the document and printed on a sheet of paper. Generally, when a read start key is pushed down in the condition that a document cover is closed after a document is mounted on a document table, the document is copied. When a large number of documents need to be copied, much labor is however required for completing the copying of all the documents if a large number of operations are required for completing the copying of one document.

Therefore, a copying machine described in JP-A-H3-264964 is designed as follows. When the document cover is closed after documents are set on the document table (document mounting table), copying of the documents starts. The copying of the documents is continued until the number of copied documents reaches a set number or until a copy key is pushed down. That is, when the document cover is closed, copying of documents can start without any operation of designating the start of copying (e.g. pushing a document read start key). Accordingly, a procedure in user's operations is omitted to reduce labor imposed on the user. In the copying machine described in JP-A-H3-264964, a copy mode selection switch is provided for selecting one copy mode from two copy modes, namely, a first mode in which copying of documents starts when the read start key is pushed down in the condition that the document cover is closed, and a second mode in which copying of documents starts when the document cover is closed.

JP-A-H3-264964 (FIG. 4) is referred to as a related art.

In JP-A-H3-264964, however, the copy mode selection switch is a slide switch. For example, a user may leave the copy mode selection switch in the second mode after copying of documents in the second mode is completed. If a next user performs copying of documents in this condition without checking the copy mode selection switch, copying starts when the next user closes the document cover. That is, there is a possibility that copying not wished by the next user will be executed.

SUMMARY OF THE INVENTION

The object of the invention is to provide an image reading apparatus in which document reading based on the opening/closing of a document cover can be prevented from starting when a predetermined time has passed after the last document reading, and a copying machine equipped with the image reading apparatus.

The invention provides an image reading apparatus having: a read table on which a source document is mounted; a document cover held on the read table openably and closably with respect to the read table; and an opening/closing detection section that detects an opened state and a closed state of the document cover; a read mode switching section that switches between a continuous read mode and an ordinary read mode, the continuous read mode where an image formed on the source document is read when the opening/closing detection section detects the closed state of the document cover after detecting the opened state, the ordinary read mode where an image formed on the source document is read according to an instruction by a user of the image reading apparatus regardless of the opened state or the closed state of the document cover; a timer section that measures an elapsed time since the read mode switching section switches to the continuous read mode; and a reset section that resets the elapsed time when the opening/closing detection section detects the closed state of the document cover in the continuous read mode, wherein the read mode switching section switches from the continuous read mode to the ordinary read mode when the elapsed time reaches a first predetermined time.

Therefore, the source document can be read in the continuous read mode simply when a series of operations for mounting a source document on the read table and closing the document cover are carried out. Accordingly, it is easy for the user to handle with the image reading apparatus, so that convenience for the user enhances. Moreover, the elapsed time is measured based on the opened/closed operation of the read cover, so that the continuous read mode can be terminated when the first predetermined time has passed. Accordingly, a user does not need to check the read mode when the user performs the reading in the ordinary read mode after the first predetermined time has passed.

DETAILED DESCRIPTION OF THE PREFERRED EMBODIMENTS

Figure 1:
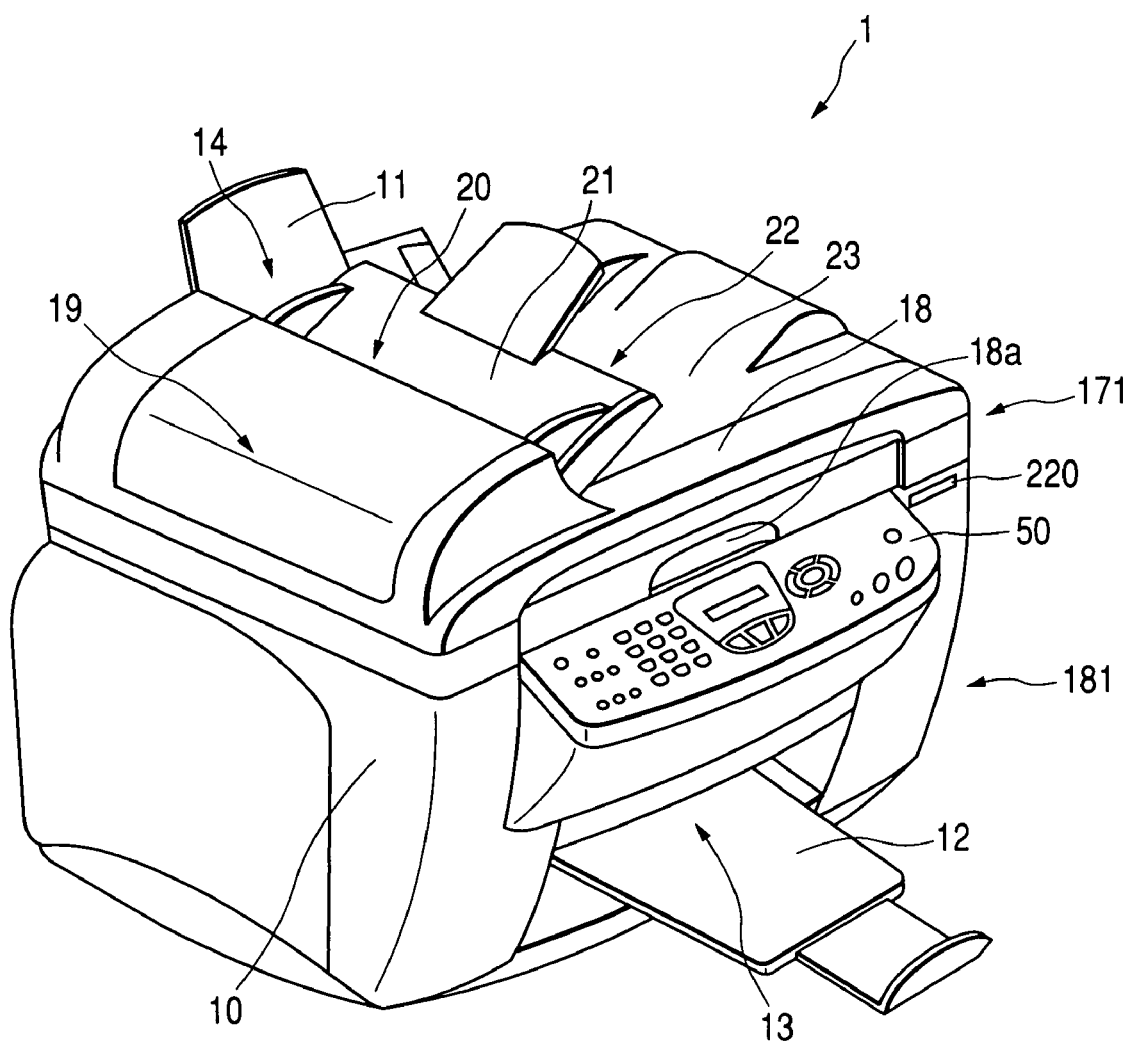
FIG. 1 is a perspective view showing the external appearance of a composite machine 1.
Figure 2:
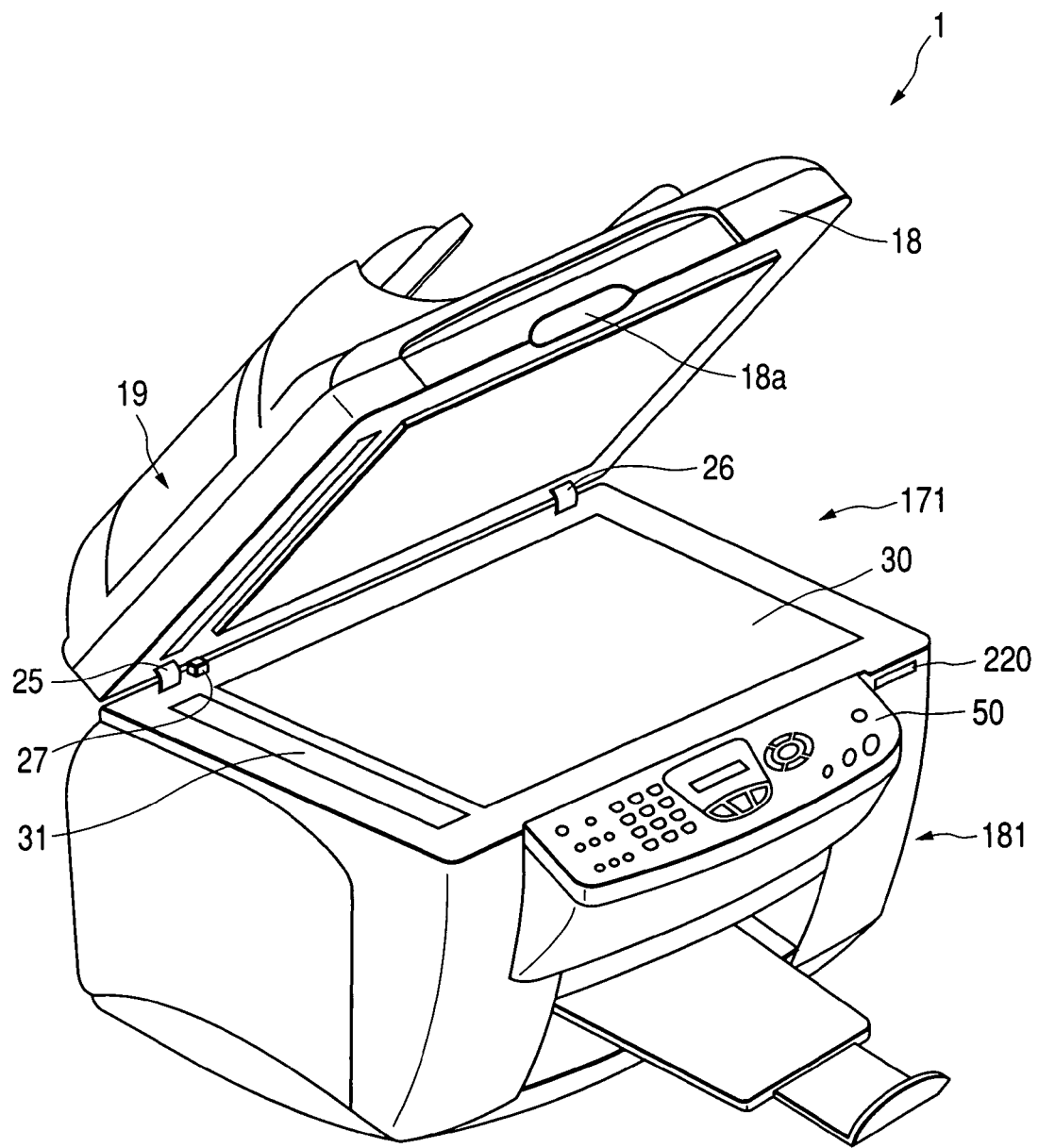
FIG. 2 is a perspective view showing a state in which an upper cover portion 18 of the composite machine 1 is opened.
Figure 3:
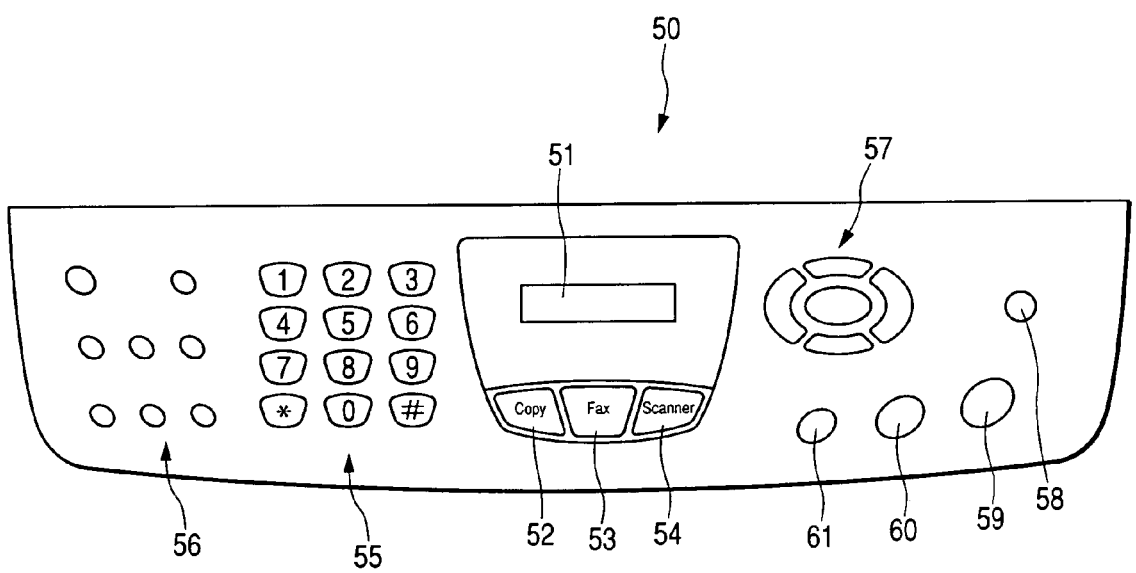
FIG. 3 is a view showing an operation portion 50.

An image reading apparatus embodying the invention and an embodiment of a copying machine equipped with the image reading apparatus will be described below with reference to the drawings while a composite machine 1 equipped with an image reading apparatus according to the invention is taken as an example. First, the overall configuration of the composite machine 1 will be described with reference to FIGS. 1 to 3. FIG. 1 is a perspective view showing the external appearance of the composite machine 1. FIG. 2 is a perspective view showing a state in which an upper cover portion 18 of the composite machine 1 is opened. FIG. 3 is a view showing an operation portion 50.

As shown in FIG. 1, the composite machine 1 having a copying function for reading an image of a document and printing the image on a sheet of paper has a housing 10 substantially shaped like a rectangular parallelepiped formed so as to be slightly laterally wide. The composite machine 1 has a printer portion 181, and a scanner portion 171 disposed on the printer portion 181. The printer portion 181 jets ink so that an image based on image data is formed on a recording medium. The scanner portion 171 optically reads digital data from the recording medium having the image formed thereon. The composite machine 1 has a copying function, a facsimile function, a scanner function, and a printer function. The copying function is carried out in such a manner that an image formed on a source document is read by the scanner portion 171 and printed on a sheet of paper as a recording medium by the printer portion 181. The facsimile function is carried out in such a manner that image data read by the scanner portion 171 is transmitted to the other facsimile machine through a public communication network, and that image data received from the other facsimile machine is printed by the printer portion 181. For example, the composite machine 1 is connected to a personal computer through an USB interface 190 (see FIG. 4) etc. The scanner function is carried out in such a manner that image data read by the scanner portion 171 is transmitted to the personal computer so that the image data can be used in the personal computer. The printer function is carried out in such a manner that image data received from the personal computer is printed.

The printer portion 181 of the housing 10 of the composite machine 1 has a paper feed tray 11 for feeding sheets of paper to the inside of the housing 10 through a paper feed port 14 provided in the rear of the housing 10, and a paper ejection tray 12 on which sheets of paper (after image formation) ejected from a paper ejection port 13 provided in the front of the housing 10 are stacked and held. The printer portion 181 is a known inkjet printer. For example, four kinds of ink of yellow (Y), magenta (M), cyan (C) and black (K) are jetted from an inkjet head to perform color printing on a sheet of paper. When printing is performed, sheets of paper set on the paper feed tray 11 are one by one conveyed to the inside of the printer portion 181 through the paper feed port 14 disposed in the rear of the housing 10. After printing is performed, the sheets of paper are one by one ejected from the paper ejection port 13 disposed in the front of the housing 10, so that the sheets of paper are held stratiformly on the paper ejection tray 12. In FIG. 1, the paper ejection tray 12 is formed so as to be able to be received in the bottom of the housing 10. When the paper ejection tray 12 is used, the paper ejection tray 12 is drawn to the front.

As shown in FIG. 2, an upper cover portion 18 is provided on the top of the housing 10 so that the upper cover portion 18 can be pivoted on two hinge portions 25 and 26 provided on the rear side of the housing 10. When a hand grip portion 18a provided on the front side of the housing 10 is moved up/down while gripped, the upper cover portion 18 can be opened/closed. When the upper cover portion 18 is opened, a glass plate 30 appears. The top of the inside of the housing 10 is covered with the glass plate 30. The glass plate 30 is substantially horizontally fixed in the inside of the scanner portion 171. An opening/closing switch 27 is provided in the neighborhood of the hinge portion 25 so that the opening/closing state of the upper cover portion 18 can be detected by the opening/closing switch 27. A line type CCD image sensor (not shown) is provided under the plate surface of the glass plate 30 so that an image of a document mounted on the glass plate 30 can be read as digital data by photo diodes. The scanner portion 171 is formed as a so-called FB (flat Bed) type scanner. The CCD image sensor scans the document mounted on the glass plate 30 while the CCD image sensor moves left and right (in the sub scanning direction) along the lower surface of the glass plate 30 in the condition that the front-rear direction (main scanning direction) of the housing 10 is regarded as a line direction in which the photo diodes are arrayed. The hinge portions 25 and 26 are formed so as to be slightly upward movable. Even in the case where a thick document is mounted on the glass plate 30, the upper cover portion 18 can be closed. The range allowed to be detected by the opening/closing switch 27 is set to be wide so that the opening/closing state of the upper cover portion 18 can be detected even in this case.

The left end of the glass plate 30 is partitioned so that a read window 31 is provided. An automatic document feeder (hereinafter referred to as "ADF") 19 is provided in the upper cover portion 18 so that a document passing through the upper surface of the read widow 31 can be read by the CCD image sensor moved and fixed to the lower surface of the read window 31. As shown in FIG. 1, the ADF 19 includes a feed tray 21, and an ejection tray 23. The feed tray 21 is provided so that documents stacked on the feed tray 21 can be one by one led into the ADF 19 through a feed port 20. The ejection tray 23 is provided so that documents ejected from an ejection port 22 can be stacked and held on the ejection tray 23 when reading is completed. Each document is conveyed through the feed port 20 so that the document can pass through the upper surface of the read window 31. The document is U-turned on the CCD image sensor moved to the lower surface of the read window 31 and passes through a U-turn conveyance path toward the ejection port 22. That is, the direction of conveying each document is the left-right direction of the housing 10.

An operation portion 50 is provided in the front of the housing 10 so as to extend along the left-right direction of the housing 10. The operation portion 50 has an operation surface facing on the front oblique upper direction. As shown in FIG. 3, a liquid crystal display (hereinafter referred to as "LCD") 51 is provided in the nearly center of the operation surface of the operation portion 50. When an operation is carried out or when error occurs, a massage for notifying a user is displayed on the LCD 51. Selection keys 57, a power key 58, a monochrome start key 59, a color start key 60 and a stop key 61 are provided on the right side of the LCD 51. The selection keys 57 are used for switching or selecting the message displayed on the LCD 51. The power key 58 is used for powering on/off the composite machine 1. The monochrome start key 59 is used for designating the start of monochrome copying or FAX. Similarly, the color start key 60 is used for designating the start of color (polychromatic) copying or FAX. The stop key 61 is used for designating the suspension, stop or termination of processing. A numeric keypad 55 and setting keys 56 are provided on the left side of the LCD 51. The numeric keypad 55 is used for inputting a numerical value. The setting keys 56 are used for displaying menus for various kinds of settings. Mode keys are provided on the lower side of the LCD 51 so that an operation mode of the composite machine 1 can be designated. That is, a copy mode key 52, a FAX mode key 53 and a scanner mode key 54 are provided on the lower side of the LCD 51. The copy mode key 52 is used for switching the operation mode to a copy mode when the composite machine 1 is used as a copying machine. The FAX mode key 53 is used for switching the operation mode to a FAX mode when the composite machine 1 is used as a FAX machine. The scanner mode key 54 is used for switching the operation mode to a scanner mode when the composite machine 1 is used as a scanner machine. A light-emitting diode (hereinafter referred to as "LED") 70 is provided in the inside of each mode key so that the key of an operation mode selected can be illuminated with light emitted from an LED 70 corresponding to the key.

A media drive 220 is provided on the right side of the operation portion 50 of the housing 10. The media drive 220 is used so that image data read from a document by the scanner portion 171 or image data to be printed by the printer portion 181 can be read/written from/into a known memory card 221 (see FIG. 4) such as a Smart Media card (registered trademark) or a Multi-Media card (registered trademark).

Figure 4:
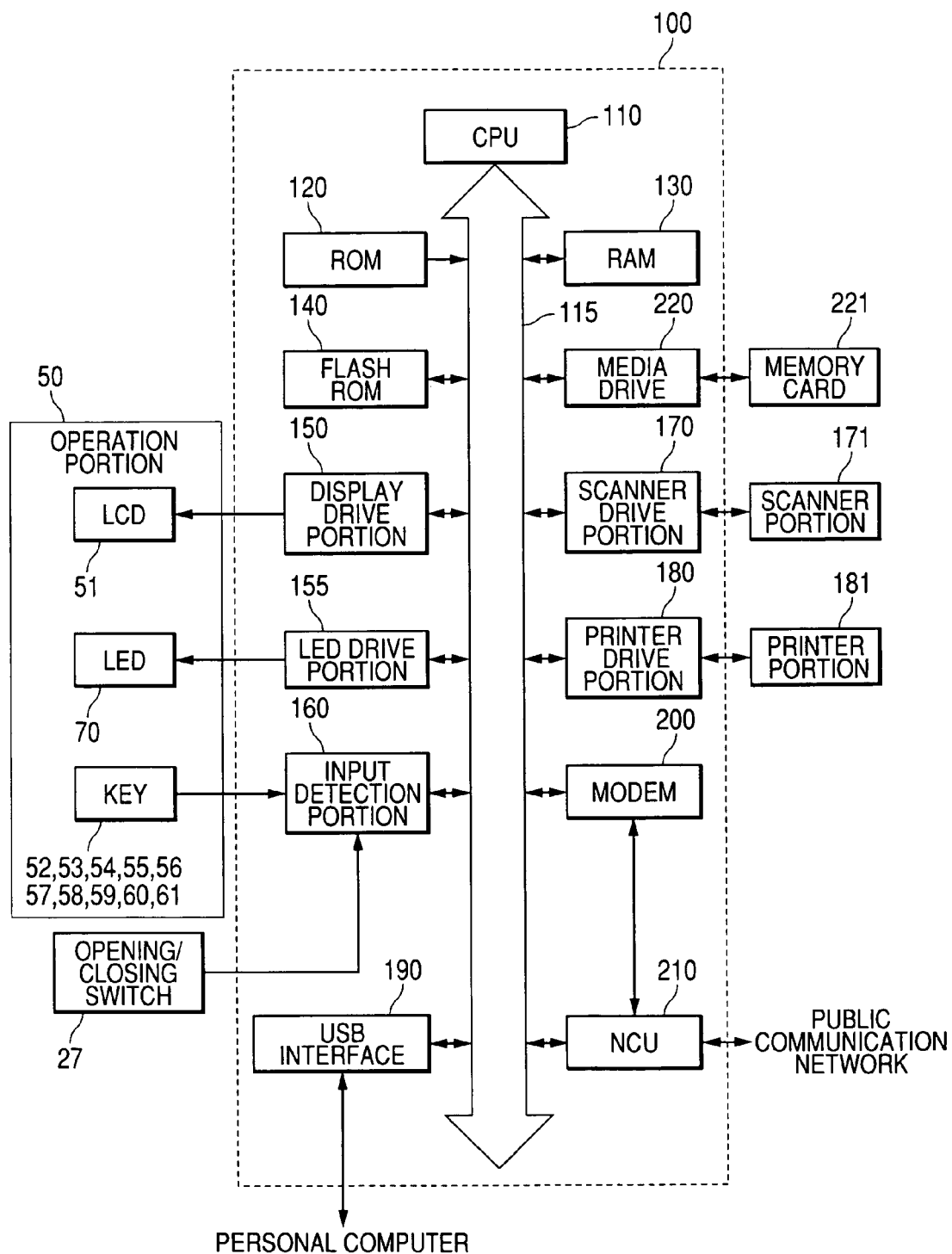
FIG. 4 is a block diagram showing the configuration of a control portion 100 of the composite machine 1.
Figure 5:
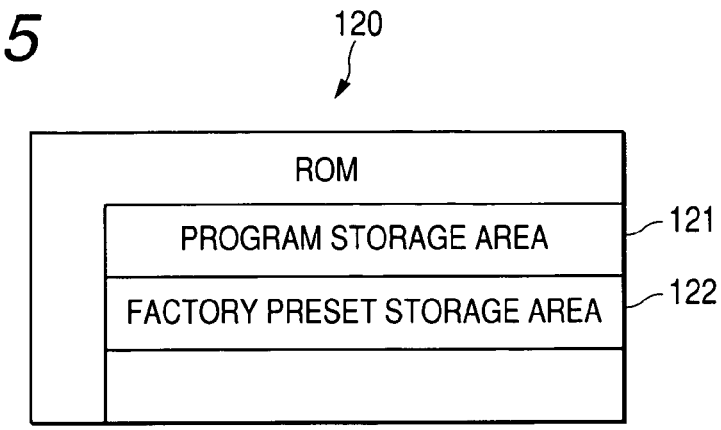
FIG. 5 is a conceptual view showing storage areas of an ROM 120.
Figure 6:
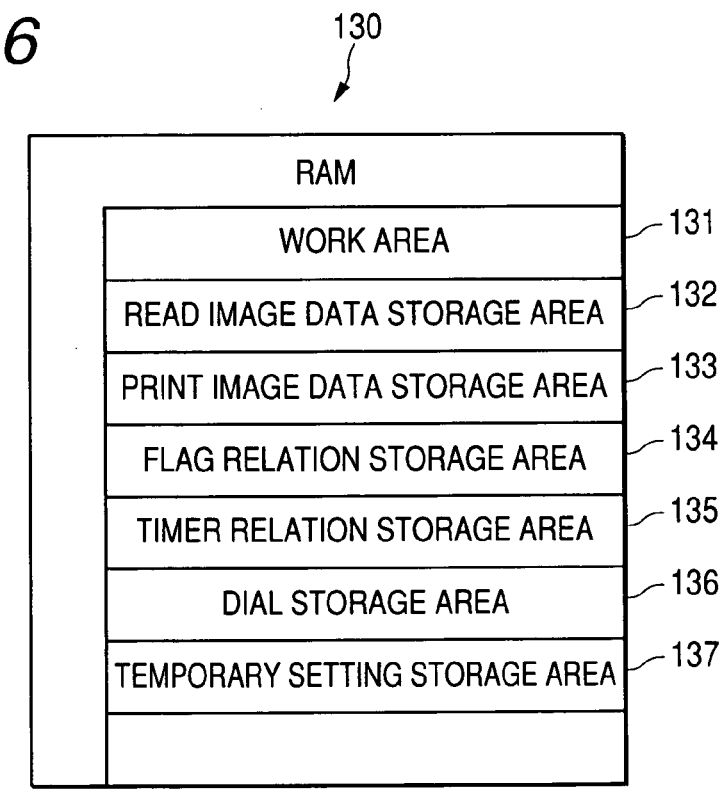
FIG. 6 is a conceptual view showing storage areas of an RAM 130.
Figure 7:
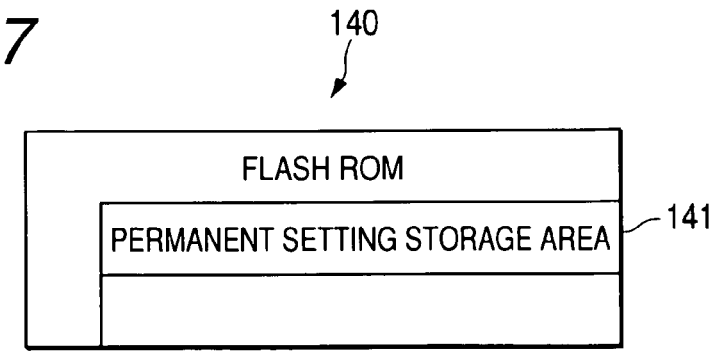
FIG. 7 is a conceptual view showing storage areas of a flash ROM 140.

The electrical configuration of the composite machine 1 will be described below with reference to FIGS. 4 to 7. FIG. 4 is a block diagram showing the configuration of a control portion 100 of the composite machine 1. FIG. 5 is a conceptual view showing storage areas of an ROM 120. FIG. 6 is a conceptual view showing storage areas of an RAM 130. FIG. 7 is a conceptual view showing storage areas of a flash ROM 140.

As shown in FIG. 4, the control portion 100 is provided in the inside of the composite machine 1. The control portion 100 controls respective portions of the composite machine 1. A CPU 110 for controlling the composite machine 1 as a whole is provided in the control portion 100. The ROM 120, the RAM 130 and the flash ROM 140 are connected to the CPU 110 through a bus 115. The ROM 120 is used for storing various kinds of programs to be executed by the CPU 110. The RAM 130 is used for temporarily storing data. The flash ROM 140 is used as a data-rewritable memory so that data stored in the flash ROM 140 can be held even in the case where power supply to the flash ROM is stopped.

A scanner drive portion 170 is further connected to the CPU 110 through the bus 115. The scanner drive portion 170 includes a circuit for driving a drive motor (not shown) and a CCD image sensor (not shown) in the ADF 19 of the scanner portion 171, and an A/D converter (not shown) for converting analog data read from a document by the CCD image sensor into digital data. A printer drive portion 180 is further connected to the CPU 110 through the bus 115. The printer drive portion 180 includes a circuit for driving an inkjet head (not shown) of the printer portion 181 to jet ink onto a sheet of paper, and a circuit for driving a conveyance motor (not shown) to convey the sheet of paper.

A display drive portion 150, an input detection portion 160 and an LED drive portion 155 are further connected to the CPU 110 through the bus 115. The display drive portion 150 controls display of an image on the LCD 51 provided in the operation portion 50. The input detection portion 160 detects inputting of the respective keys 52 to 61 in an operation panel portion 15 of the operation portion 50. The LED drive portion 155 drives the LED 70 included in each of the mode keys 52 to 54 so that the key of the currently set operation mode is illuminated with light emitted from the LED 70. A detection signal given from the opening/closing switch 27 for detecting the opening/closing state of the upper cover portion 18 is also input to the input detection portion 160, so that the opening/closing state of the upper cover portion 18 can be detected.

A modem 200 and a USB interface 190 are further connected to the CPU 110 through the bus 115. The modem 200 performs D/A conversion and A/D conversion so that FAX data can be transmitted/received to/from a terminal equipment communicating with the composite machine 1, through a public communication network which is connected to the CPU 110 through an NCU 210 and which is provided by a communication line provider. The USB interface 190 is connected to a personal computer through a USB cable. The control portion 100 may be connected to such a terminal equipment communicated with the composite machine 1 or to such a personal computer through a network such as an LAN.

The composite machine 1 has a media drive 220 which can read/write data from/into a memory card 221. The media drive 220 is connected to the CPU 110 through the bus 115. For example, in the case where the personal computer is not connected to the composite machine 1 when the scanner mode is selected as the operation mode, image data read from a document by the scanner portion 171 can be written into the memory card 221 so that the image data can be provided to the personal computer through the memory card 221. For example, image data picked up by a digital camera or the like may be stored in the memory card 221 so that the image data can be read by the composite machine 1 through the media drive 220 and printed by the printer portion 181.

Next, as shown in FIG. 5, a program storage area 121 and a factory preset storage area 122 are provided in the ROM 120. Various kinds of programs to be executed by the CPU 110 are stored in the program storage area 121. Standard setting values (setting values decided experimentally at the time of design in advance) set at the time of the start of execution of the programs are stored as initial read conditions in the factory preset storage area 122. Various kinds of storage areas not shown are further provided in the ROM 120.

Next, as shown in FIG. 6, a work area 131, a read image data storage area 132, a print image data storage area 133, a flag storage area 134, a timer storage area 135, a dial storage area 136 and a temporary setting storage area 137 are provided in the RAM 130. Temporary data generated during execution of programs are stored in the work area 131. Image data read from a document by the CCD image sensor is stored in the read image data storage area 132. Print image data expanded, for example, into the form of bit-mapped data to perform printing is stored in the print image data storage area 133. Various kinds of flags used in control programs are stored in the flag storage area 134. Count values of timers used in control programs are stored in the timer storage area 135. Destination addresses (numbers) of terminal equipments to be input at the time of transmission of FAX data are stored in the dial storage area 136. Settings in the copy mode are stored in the temporary setting storage area 137 so that temporarily changed contents of settings can be rewritten so as to be reflected at the time of processing. Various kinds of storage areas not shown are further provided in the RAM 130.

As shown in FIG. 7, a permanent setting storage area 141 is provided in the flash ROM 140. Various kinds of setting values customized by the user (changed from standard setting values in accordance with the user's favorite) are stored in the permanent setting storage area 141. Various kinds of storage areas not shown are further provided in the flash ROM 140.

Figure 8:
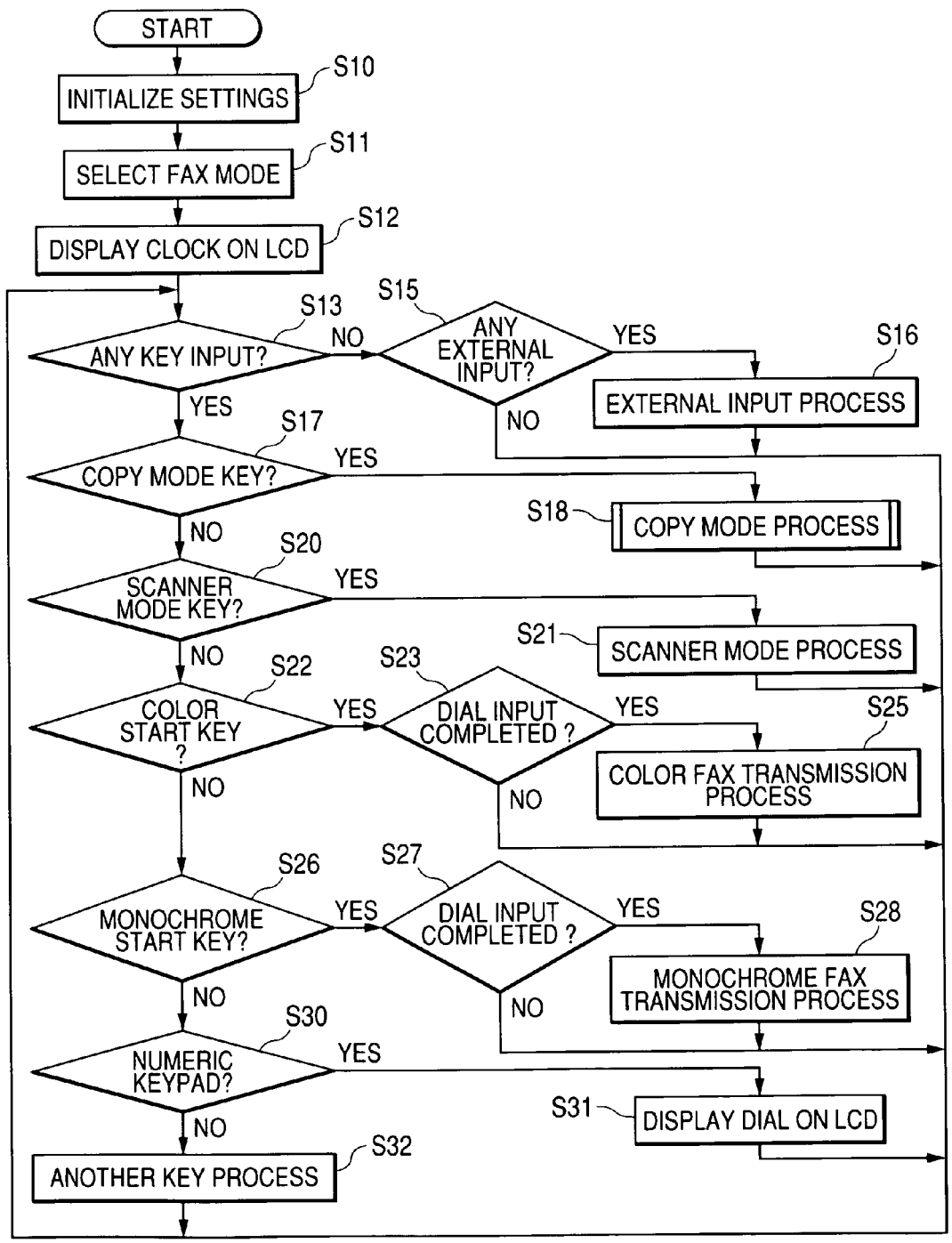
FIG. 8 is a flow chart showing the main routine of a control program used in the composite machine 1.
Figure 9:
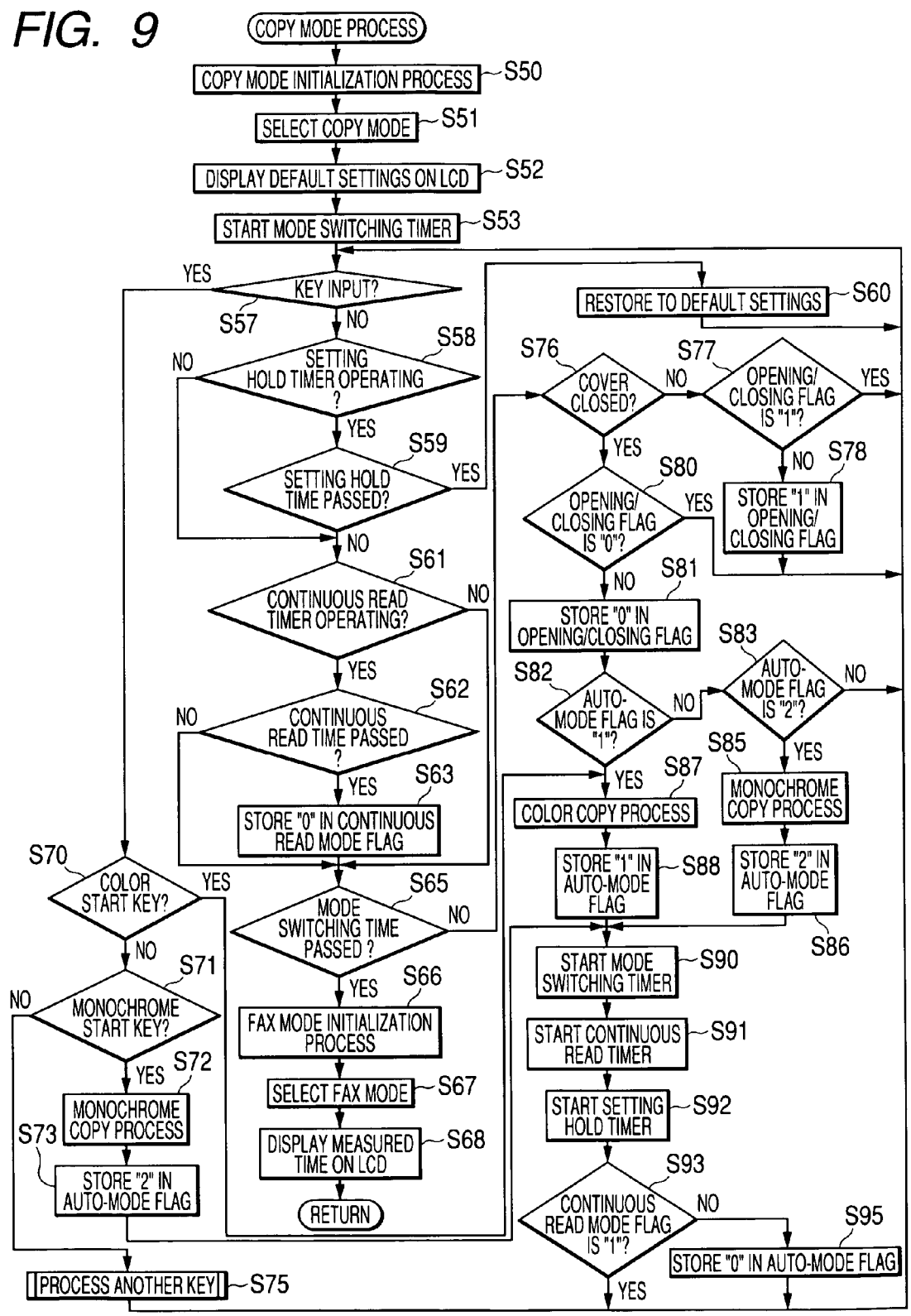
FIG. 9 is a flow chart showing the sub routine of a copy mode process called from the main routine.
Figure 10:
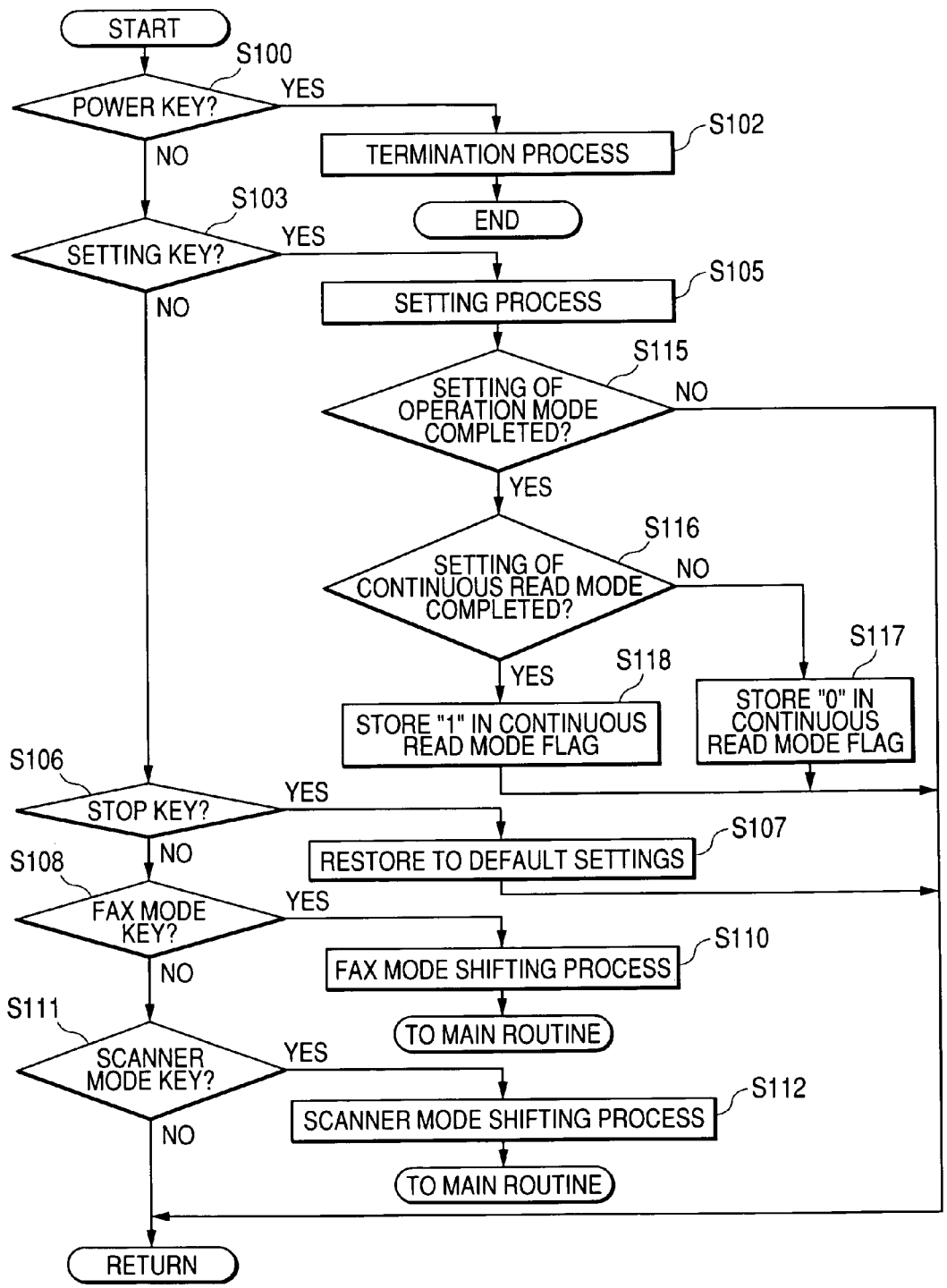
FIG. 10 is a flow chart showing the sub routine of a process for inputting other keys.

The operation of the composite machine 1 will be described below with reference to FIGS. 1 to 7 in accordance with a flow chart of a control program shown in FIGS. 8 and 9. FIG. 8 shows the main routine of the control program used in the composite machine 1. FIG. 9 shows the sub routine of a copy mode process called by the main routine. FIG. 10 shows the sub routine of another key input process. Each of the steps in the flow chart is hereinafter abbreviated to "S".

The composite machine 1 according to this embodiment is formed so that the operation mode can be shifted to selected one of three operation modes. When the composite machine 1 is powered on, a FAX mode is selected so that image data read from a document can be transmitted. When the user pushes down the scanner mode key 54 to shift the operation mode of the composite machine 1 to a scanner mode, image data read from a document by the scanner portion 171 can be transmitted to a personal computer or stored in a memory card 221. When the user pushes down the copy mode key 52 to shift the operation mode of the composite machine 1 to a copy mode, the image read from a document by the scanner portion 171 can be formed on a sheet of paper by the printer portion 181.

In the copy mode, when the user performs a copying process continuously, the composite machine 1 monitors the opening/closing state of the cover (upper cover portion 18). When the cover is closed, settings used in the previous copying process can be reflected as they are and used for performing a next copying process. In the control program for achieving this, three flags are used, that is, an auto-mode flag, an opening/closing flag and a continuous read mode flag are used. One of values "0", "1" and "2" is stored in the auto-mode flag. The value "0" of the auto-mode flag indicates that the copying process has not been made yet. The value "1" of the auto-mode flag indicates that the color copying process for reading color (polychromatic) data from a document and printing the color data has been already made. The value "2" of the auto-mode flag indicates that the monochrome copying process for reading monochrome data from a document and printing the monochrome data has been already made. One of values "0" and "1" is stored in the opening/closing flag. The opening/closing flag is a flag programmatically indicating whether the cover is opened or closed. When the cover is opened, the value "1" is stored in the opening/closing flag. When the cover is closed, the value "0" is stored in the opening/closing flag. When, for example, the opening/closing flag is "1" but the state of the opening/closing switch 27 indicates that the cover is closed, a decision can be made that the cover is closed at this timing. In the continuous read mode in which the copying process is carried out continuously, when the cover is closed, the copying process starts. In the ordinary read mode in which the copying process starts on the basis of the user's instruction, the start of the copying process is not synchronized with the opening/closing of the cover. The continuous read mode flag is programmatically managed by two values "1" and "0" which indicate the continuous read mode and the ordinary read mode respectively. The auto-mode flag, the opening/closing flag and the continuous read mode flag are stored in the flag storage area 134.

In the control program, when a predetermined time has passed from the last copying process carried out in the copy mode, a process of returning the operation mode to a FAX mode is carried out. A mode switching timer TM1 is used for measuring the time (mode switching time) required for shifting the operation mode from a copy mode to a FAX mode. A storage area for storing the count value of the mode switching timer TM1 is provided in the timer storage area 135 so that the count value of the mode switching timer TM1 can be updated in synchronism with the operating clock of the composite machine 1. Similarly, storage areas for storing the count value of a setting hold timer TM2 and the count value of a continuous read timer TM3 are provided in the timer storage area 135. The setting hold timer TM2 is a timer for measuring the time (setting hold time) required for temporarily storing settings to be reflected on a result of processing changed by the user before the start of the copying process. The continuous read timer TM3 is used for measuring the time (continuous read time) that the continuous read mode is selected as the read mode (containing the continuous read mode and the ordinary read mode). The CPU 110 controls the continuous read timer TM3 to measure the continuous read time as a first predetermined time and controls the setting hold timer TM2 to measure the setting hold time as a second predetermined time.

In the composite machine 1 according to this embodiment, when the pushing of the power key 58 is detected, that is, when the composite machine 1 is powered on, the control program stored in the program storage area 121 of the ROM 120 is read into the work area 131 of the RAM 130 and executed. As shown in FIG. 8, when the control program is executed, an initialization process is first carried out (S10). The respective storage areas of the RAM 130 except the work area 131 are initialized. Drivers for driving the CCD image sensor (not shown) and the inkjet head (not shown) etc. are also initialized. Initial settings at the time of execution of the control program are read and set as parameters at the time of execution of the program. The initial settings are standard apparatus settings (decided experimentally at the time of design in advance) stored in the factory preset storage area 122 of the ROM 120. With respect to setting values (conditions such as document size and resolution at the time of reading a document) which can be changed at option by the user, preset values are set as initial values. When there is any setting stored in the permanent setting storage area 141 of the flash ROM 140, standard settings are overwritten by the setting. Accordingly, settings customized in accordance with the user's favorite can be reflected in the initial settings.

Then, a FAX mode is selected as an operation mode in the initial state (S11). On this occasion, the LED 70 included in the FAX mode key 53 is turned on to illuminate the FAX mode key 53 with light emitted from the LED 70. Further, various settings for FAX communication are made in such a manner that standard setting values read from the factory preset storage area 122 are stored in the work area 131 and then overwritten with setting values stored in the permanent setting storage area 141. Then, a clock indicating the current time is displayed on the LCD 51 (S12). A timer program not shown is executed to measure the current time.

In steps S13 to S32, an input queue of respective keys of the operation portion 50 is processed so that various processes are carried out in accordance with input keys. First, in S13, a judgment is made as to whether there is a key input or not (S13). If the input detection portion 160 does not detect the input of any one of the keys 52 to 61 (S13:NO), a judgment is made as to whether there is an external data input such as input of data from a personal computer through the USB interface 190, input of data from a terminal equipment communicated with the composite machine 1 through a public communication network connected by the NCU 210 or input of data read from the memory card 221 by the media drive 220 (S15). If there is an external data input (S15:YES), the input data is processed (S16) and the current position of the routine goes back to S13 after the completion of S16. If there is no external data input (S15:NO), the current position of the routine goes back to S13 and the key input monitoring is continued.

If the input of any one of the keys 52 to 61 of the operation portion 50 is detected (S13:YES), a process is carried out in accordance with the input key. If the copy mode key 52 is pushed down (S17:YES), the sub routine of a copy mode process shown in FIG. 9 is called (S18). The copy mode process will be described later. When the sub routine of the copy mode process is completed, the current position of the routine goes back to S13 as shown in FIG. 8 and the aforementioned key input queue is continued.

If the input of the scanner mode key 54 is detected (S17:NO, S20:YES), a scanner mode process is carried out (S21). The scanner mode is an operation mode for using the composite machine 1 as a scanner machine. If a personal computer is connected to the composite machine 1, image data read from a document by the scanner portion 171 can be transmitted to the personal computer on the basis of control due to a scanner driver which is installed in the personal computer in advance. In the condition that a memory card 221 is set in the media drive 220, the image data read by the scanner portion 171 can be written, for example, as JPEG image data in the memory card 221. The details of these operations will be omitted because these operations are commonly known. When the scanner mode process is completed, the current position of the routine goes back to S13 and the key input queue is continued. When the scanner mode process is required, the LED 70 included in the scanner mode key 54 is turned on and the operation mode is changed to the scanner mode. When the scanner mode process is completed, the operation mode is changed to the FAX mode as the initial mode, so that initial settings for the FAX mode are made and the LED 70 included in the FAX mode key 53 is turned on.

If the input of the color start key 60 is detected (S17:NO, S20:NO, S22:YES), a process for reading color (polychromatic) data from a document and transmitting the color data is carried out because the current operation mode is the FAX mode. It is however necessary to designate a destination of the transmission of the color data before the color data is transmitted. Therefore, the content stored in the dial storage area 136 is referred to. If there is no data stored in the dial storage area 136, a decision is made that there is no dial input of the destination address (number) (S23:NO), and the current position of the routine goes back to S13 without execution of the process. On the other hand, if the dial input of the destination address (number) is completed (S23:YES), the color FAX transmission process is carried out (S25).

The color FAX transmission process is a process in which: color image data is read from a document mounted on the glass plate 30 or one of documents set in the ADF 19 by the CCD image sensor (not shown); the image data is compressed by execution of a data compression program not shown; the compressed image data is converted into analog FAX data by the modem 200; and the FAX data is transmitted to a terminal equipment communicated with the composite machine 1 through a public communication network by the NCU 210. When the color FAX transmission process is completed, the current position of the routine directly goes back to S13 because the operation mode is still the FAX mode. On this occasion, the clock is displayed on the LCD 51.

If the input of the monochrome start key 59 is detected (S17:NO, S20:NO, S22:NO, S26:YES), a process for reading monochrome image data from a document and transmitting the monochrome image data is carried out. Like the color FAX transmission process, it is necessary to designate a destination of the transmission of the monochrome image data before the monochrome image data is transmitted. Accordingly, if the dial input of the designation address (number) is not completed (S27:NO), the current position of the routine goes back to S13 without execution of the process. On the other hand, if the dial input of the destination address (number) is completed (S27:YES), the monochrome FAX transmission process is carried out (S28). The monochrome FAX transmission process is substantially the same as the color FAX transmission process. That is, monochrome image data is read from a document and monochrome Fax data generated from the image data is transmitted to a terminal equipment communicated with the composite machine 1. When the monochrome FAX transmission process is completed, the current position of the routine directly goes back to S13 because the operation mode is still the FAX mode.

If the input of the numeric keypad 55 is detected (S17:NO, S20:NO, S22:NO, S26:NO, S30:YES), the designation address (number) of the terminal equipment as a destination of transmission of FAX data is regarded as being input and a numerical value corresponding to the detected key is stored in the dial storage area 136. The input destination address (number) is displayed on the LCD 51 (S31), so that the user can confirm the destination address (number). Then, the current position of the routine goes back to S13 so that the input of the next digit of the destination address (number) is continued because the destination address (number) is generally constituted by a number with several digits.

If the input of any other key (such as a setting key 56, a stop key 61, a selection key 57 and a power key 58) than the aforementioned keys is detected (S17:NO, S20:NO, S22:NO, S26:NO, S30:NO), a process associated with the input key in advance is carried out (S32). When, for example, the power key 58 is pushed down, a process for powering off the composite machine 1 is carried out. When, for example, the stop key 61 is pushed down, a process for suspending or stopping the currently processed operation (e.g. a process for clearing up the designation address (number) input incompletely) is carried out. When, for example, settings are changed in the condition that the settings are enabled to be customized by the operation of the setting key 56, the changed settings are stored in the permanent setting storage area 141. (As will be described later, settings changed in the condition that the settings are disabled from being customized are stored as temporary settings in the temporary setting storage area 137 so that the contents of the changed settings can be invalidated with the passage of a predetermined time or by a specific operation.) As a result, the standard settings obtained by initialization in S10 are overwritten with the settings customized by the user. When the FAX mode key 53 is pushed down, there is no process carried out because the operation mode is still the FAX mode. After a process corresponding to any other key is completed, the current position of the routine goes back to S13 so that the composite machine 1 waits for the input of the next key.

The sub routine of the copy mode process called in S18 will be described below. As shown in FIG. 9, when the sub routine of the copy mode process is called, an initialization process required for operating the composite machine 1 in the copy mode is first carried out (S50). For example, the storage area used in the copy mode is initialized. In the initialization, more limited contents are initialized compared with contents in the initialization (S10) at the time of powering on the composite machine 1.

Then, the copy mode is set as the operation mode (S51), so that the LED 70 included in the copy mode key 52 is turned on. Various values necessary for the copying operation are set in such a manner that standard setting values read from the factory preset storage area 122 are stored in the temporary setting storage area 137 and overwritten with the setting values stored in the permanent setting storage area 141. Further, the respective flags are initialized as follows. The value "0" is stored in the auto-mode flag so that it indicates a "non-copy" state in which the continuous copying operation has been not started yet. The value "0" is stored in the opening/closing flag so that it programmatically indicates a state in which the document cover (upper cover portion 18) is closed. The value "0" is stored in the continuous read mode flag so that it indicates an ordinary read mode. The CPU 110 performs controlling so that the setting values stored in the factory preset storage area 122 and the setting values stored in the permanent setting storage area 141 are stored in the temporary setting storage area 137 in the step S51.

Then, the initial (default) setting values stored in the temporary setting storage area 137 are displayed on the LCD 51 (S52). For example, the initial setting values are a value indicating that the copy magnification is 100%, a value indicating that the number of copies is one, and so on. Further, counting the mode switching timer TM1 starts (S53).

Then, a judgment is made as to whether there is a key input or not (S57). If the input detection portion 160 does not detect the input of any one of the keys 52 to 61 (S57:NO), a judgment is made in the aforementioned manner as to whether the setting hold timer TM2 is operating or not (S58). When the copying operation has never started, the setting hold timer TM2 has not operated yet (S58:NO). Accordingly, a judgment is made as to whether the continuous read timer TM3 is operating or not (S61). When the copying operation has never started, the continuous read timer TM3 has not operated yet (S61:NO). Accordingly, the current position of the routine goes to S65.

In S65, a judgment is made as to whether the mode switching time has passed or not (S65). That is, in S65, a judgment is made as to whether the count value of the mode switching timer TM1 having started in S53 reaches a count value corresponding to a predetermined mode switching time or not. For example, the mode switching time is 3 minutes. In the composite machine 1 according to this embodiment, when the time of 3 minutes has passed without start of a next copying process after the last copying process, the copy mode is terminated and the operation mode is returned to the FAX mode.

If the mode switching time has not passed yet at this point of time (S65:NO), the current position of the routine goes to steps S76 to S80 in which a judgment is made as to whether the actual opening/closing state of the cover (upper cover portion 18) based on the detection of state by the opening/closing switch 27 is coincident with the programmatic opening/closing state of the cover based on the opening/closing flag or not. First, the state of the opening/closing switch 27 is checked. If the cover is opened (S76:NO), the state of the opening/closing flag is checked (S77). If the opening/closing flag is "1" and indicates that the actual opening/closing state of the cover is coincident with the programmatic opening/closing state of the cover (S77:YES), the current position of the routine goes back to S57 without execution of any process. If the opening/closing flag is "0" (S77:NO), the value "1" is stored in the opening/closing flag to make the actual opening/closing state of the cover coincident with the programmatic opening/closing state of the cover (S78) and then the current position of the routine goes back to S57.

On the other hand, if the cover is closed (S76:YES) when the state of the opening/closing switch 27 is checked, the state of the opening/closing flag is checked in the aforementioned manner (S80). If the opening/closing flag is "0" (S80:YES), the current position of the routine goes back to S57 because the actual opening/closing state of the cover is coincident with the programmatic opening/closing state of the cover. If the actual opening/closing state of the cover is not coincident with the programmatic opening/closing state of the cover (S80:NO), the value "0" is stored in the opening/closing flag to make the actual opening/closing state of the cover coincident with the programmatic opening/closing state of the cover (S81) and then the current position of the routine goes to S82. In S82, a judgment is made as to whether the auto-mode flag is "1" or not (S82). When the copying process has never started yet, the auto-mode flag is "0" (S82:NO). Accordingly, the current position of the routine goes to S83. In S83, similarly, a judgment is made as to whether the auto-mode flag is "2" or not (S83). Because the auto-mode flag is still "0" at this point of time (S83:NO), the current position of the routine goes back to S57.

If the input of any one of the keys 52 to 61 of the operation portion 50 is detected (S57:YES), the current position of the routine goes to S70. If the color start key 60 is pushed down (S70:YES), a color copying process is carried out (S87). That is, color image data is read from a document put on the glass plate 30 or one of documents set in the ADF 19 by the CCD image sensor (not shown). On this occasion, settings stored in the temporary setting storage area 137 and used for the copying operation are referred to. Image data is read in accordance with resolution set for reading an image from the document. The read image data is stored in the read image data storage area 132 and further subjected to known image processing in accordance with the settings which are stored in the temporary setting storage area 137 and used for the copying operation. That is, the scale-up or scale-down ratio of the image data is adjusted in accordance with lightness, light and shade, color tone and document size. The image data subjected to image processing is converted into bit-mapped data. The bit-mapped data is stored as print data in the print image data storage area 133. The printer portion 181 performs color printing on sheets of paper corresponding to the set number of read documents by using such print data. Thus, the color copying operation is performed.

When the color copying process is completed, the value "1" is stored in the auto-mode flag (S88) and the count value of the mode switching timer TM1 restarts from "0" (S90). Further, both counting the continuous read timer TM3 and counting the setting hold timer TM2 start (S91, S92). If the continuous read mode is set by the operation of the setting key in the step S75 which will be described later and the value "1" is stored in the continuous read mode flag (S93:YES), the current position of the routine goes back to S57. If the continuous read mode flag is "0", that is, if the continuous read mode is set (S93:NO), the value "0" is stored in the auto-mode flag (S95) so that the start of the copying process cannot be synchronized with the opening/closing of the cover (upper cover portion 18), that is, the copying process can start only when the color start key 60 or the monochrome start key 59 is pushed down. Then, the current position of the routine goes back to S57.

After counting the setting hold timer TM2 starts (S58: YES), a judgment is made as to whether the count value of the setting hold timer TM2 reaches a count value corresponding to a setting hold time set in advance (S59). For example, the setting hold time is 1 minute. In the composite machine 1 according to this embodiment, settings changed without customization before the start of the copying operation are invalidated so as to be restored to the setting state in S51 when the time of 1 minute has passed without the start of a next copying process after the last copying process. For this reason, if the setting hold time has not passed (S59:NO), the current position of the routine goes to S61. If the setting hold time has passed (S59:YES), a process for restoring the settings to default settings is carried out (S60). That is, in the step S60, the processes shown in S51 and S52 and a process for stopping the operations of the setting hold timer TM2 and the continuous read timer TM3 are carried out. With respect to the read mode, the continuous read mode or the ordinary read mode is retained as it is. Then, the current position of the routine goes back to S57.

In S57, a key input queue is made as follows. If the monochrome start key 59 as one of the keys 52 to 61 of the operation portion 50 is pushed down (S70:NO, S71:YES), a monochrome copying process is carried out (S72). A monochrome copying operation is made in the same manner as in the color copying process. When the process is completed, the value "2" is stored in the auto-mode flag (S73). Counting the mode switching timer TM1 restarts from "0" (S90). Counting the setting hold timer TM2 starts (S92). If the continuous read mode is set (S93:YES), the current position of the routine directly goes back to S57. If the ordinary read mode is set (S93:NO), the value "0" is stored in the auto-mode flag (S95) and then the current position of the routine goes back to S57.

The CPU 110 performs controlling so that the count value of the mode switching timer TM1 is reset to restart counting from "0" in the step S90.

On the other hand, after counting the continuous read timer TM3 starts when the setting hold time has not passed in S59 (S59:NO, S61:YES), a judgment is made as to whether the continuous read time has passed or not (S62). The continuous read time is provided as one condition for changing the continuous read mode to the ordinary read mode when the user selects the continuous read mode in the step S75 (which will be described later) to synchronize the start of the copying process with the opening/closing of the cover. When, for example, the continuous read time of 2 minutes has passed without the start of a next copying process after the last copying process, the continuous read mode is terminated so as to be changed to the ordinary read mode. The case where the user designates the ordinary read mode as the read mode in S75 is provided as another condition for changing the continuous read mode to the ordinary read mode. If the continuous read time has not passed (S62:NO), the current position of the routine goes to S65. If the continuous read time has passed (S62:YES), the value "0" is stored in the continuous read mode flag (S63) and then the current position of the routine goes to S65.

If the input key as one of the keys 52 to 61 of the operation portion 50 is neither color start key 60 nor monochrome start key 59 (S57:YES, S70:NO, S71:NO), a process associated with the key in advance is carried out (S75). In the process, the sub routine of another key input process shown in FIG. 10 is called.

As shown in FIG. 10, in the sub routine of another key input process, a process is carried out when the input key is any one of the setting key 56 (S103), the power key 58 (S100), the stop key 61 (S106), the FAX mode key 53 (S108) and the scanner mode key 54 (S111). If the input key is any one of the numeric keypad 55, the selection key 57 and the copy mode key 52 (S103:NO, S106:NO, S108:NO, S111:NO), the current position of the routine goes back to the sub routine of the copy mode process without execution of any process.

If the power key 58 is pushed down (S100:YES), a termination process for powering off the composite machine 1 is carried out (S102), so that the composite machine 1 is powered off. If the setting key 56 is pushed down (S100:NO, S103:YES), a setting process based on the following operation (using the numeric keypad 55 and the selection key 57) is carried out (S105). If settings for the copying operation are temporarily changed (e.g. read resolution is temporarily changed, the content of image processing is changed or the number of copies or document size is changed), the corresponding content stored in the temporary setting storage area 137 is overwritten with the changed content. If settings are changed in a state in which the settings are enabled to be customized, the changed settings are stored in the permanent setting storage area 141. If the operation mode is set (S115:YES) and the continuous read mode is set (S116:YES) when the setting process is carried out, the value "1" is stored in the continuous read mode flag (S118). If the ordinary read mode is set (S116:NO), the value "0" is stored in the continuous read mode flag (S117). Then, the current position of the routine goes back to the sub routine of the copy mode process. If the operation mode is not set (S115:NO), the current position of the routine also goes back to the sub routine of the copy mode process. The CPU 110 switches the operation mode by setting the continuous read mode in the step S118 or setting the ordinary read mode in the step S117 on the basis of the operation of the setting key 56 in the step S105. The CPU 110 functions as "read mode switching section". The CPU 110 also changes temporary settings for the copying operation on the basis of the operation in the step S105. The CPU 110 also functions as "read condition setting section". The CPU 110 also switches the continuous read mode over to the ordinary read mode in the step S117 on the basis of the operation in the step S105.

If the stop key 61 is pushed down (S100:NO, S103:NO, S106:YES), the same process as in S60 is carried out so that the temporarily changed settings are reset. On this occasion, the auto-mode flag is set at "0". Accordingly, if the stop key 61 is pushed down and the cover is closed after the copying process is executed continuously, a copying process can be prevented from being executed in the condition that there is no document mounted on the glass plate 30. Then, the current position of the routine goes back to S57 in which the composite machine 1 waits for the input of a next key.

If the FAX mode key 53 is pushed down (S100:NO, S103:NO, S106:NO, S108:YES) or if the scanner mode key 54 is pushed down (S100:NO, S103:NO, S106:NO, S108:NO, S111:YES), a process (which will be described later) required for switching the mode in the same manner as in the steps S66 to S68 is carried out (S110 or S112) and then the current position of the routine goes back to the main routine shown in FIG. 8. Then, the operation mode is switched in accordance with the input key.

As described above, when a color or monochrome copying process is started by the color start key 60 or the monochrome start key 59, the value "1" or "2" is stored in the auto-mode flag. In the composite machine 1 according to this embodiment, controlling is made on the basis of the auto-mode flag so that a copying process can be performed without pushing of the color start key 60 or the monochrome start key 59 if the cover (upper cover portion 18) is closed when the setting hold time has not passed after the last copying process. According to this controlling, when, for example, sheets of documents need to be copied continuously, the operation of pushing down the color start key 60 or the monochrome start key 59 can be dispensed with as the last step in the steps of: opening the cover after completion of the copying process for a certain document; removing the document; setting a next document; closing the cover; and pushing down the color start key 60 or the monochrome start key 59 to start the copying process for the next document.

For this reason, as shown in FIG. 9, if the closing of the cover is detected (S76:YES, S80:NO) and the auto-mode flag is "1" in S82 (S82:YES), the color copying process started by pushing of the color start key 60 restarts without change of the temporarily changed settings (S87) and the value "1" is stored in the auto-mode flag. (When the closing of the cover is detected by the opening/closing switch 27 but the cover is opened programmatically, a decision is made that the cover is closed at this timing). If the auto-mode flag is "2" (S82:NO, S83:YES), the monochrome copying process started by pushing of the monochrome start key 59 restarts without change of the temporarily changed settings (S85) and the value "2" is stored in the auto-mode flag (S86). In each case, counting the mode switching timer TM1 restarts from "0" (S90). Both counting the continuous read timer TM3 and counting the setting hold timer TM2 restart from "0" (S91, S92). If the continuous read mode is selected (S93:YES), the current position of the routine directly goes back to S57. If the ordinary read mode is selected (S93:NO), the value "0" is stored in the auto-mode flag and then the current position of the routine goes to S57 (S95).

If the copying process (S72, S85, S87) has been executed even once, the count values of the mode switching timer TM1, the setting hold timer TM2 and the continuous read timer TM3 are reset. Even in the case where the composite machine 1 is left while user's settings remain in the composite machine 1 after the copying process is completed, the steps S66 to 68 can be carried out in this embodiment because the copy mode is terminated so as to be changed to the FAX mode when the time of 3 minutes set in the mode switching timer TM1 has passed (S65:YES).

In S66, the storage area used in the FAX mode is initialized (S66). In the initialization, more limited contents can be initialized compared with the initialization (S10) made at the time of powering on the composite machine 1. Then, the FAX mode is set as the operation mode in the same manner as in S11 (S67). The clock indicating the present time is displayed on the LCD in the same manner as in S12 (S68). When these steps are completed, the copying mode process is terminated and the current position of the routine goes back to the main routine of the control program.

As described above, in the composite machine 1 according to this embodiment, when documents need to be copied continuously in the copy mode, temporary settings first changed are reserved so that the temporary settings can be reflected in the copying process after that. When the cover (upper cover portion 18) is closed after a document is mounted on the glass plate 30, the copying process starts. Accordingly, it is unnecessary to designate the start of copying by pushing the color start key 60 or the monochrome start key 59 whenever copying is executed. When the setting hold time (e.g. 1 minute) has passed without execution of a next copying process after the last copying process, the temporarily changed settings for the copying process are initialized. When the mode switching time (e.g. 3 minutes) has passed, the copy mode is terminated so as to be changed to the FAX mode. Accordingly, even in the case where the composite machine 1 is left while the settings temporarily changed by a user remain in the composite machine 1, there is no influence of the settings when a next user uses the composite machine 1 if the predetermined time has passed.

It is a matter of course that various changes may be made on the invention. For example, when image data is read from a document, brightness of all pixels constituting the read image data may be checked so that image processing or printing can be stopped on the basis of a decision which is made that there is no image formed on the document or that there is no document on the glass plate 30 when the brightness is higher or lower than a predetermined threshold decided experimentally. Although the composite machine 1 according to this embodiment is formed so that a color copying process can be carried out, the composite machine may be formed so that only a monochrome copying process can be carried out. The printer portion 181 may be made of a known laser printer.

The image reading apparatus according to the invention and the copying machine equipped with the image reading apparatus may be applied not only to the composite machine according to the invention but also to an image reading apparatus such as a scanner, an image transfer apparatus such as a facsimile machine and a copying apparatus such as a copying machine.

The image reading apparatus has a read condition storage section that stores a read condition referred to when the source document is read; an initial condition storage section that stores an initial condition of the read condition; a read condition setting section that stores the initial condition stored in the initial condition storage section as the read condition into the read condition storage section; and a read condition changing section that changes the read condition stored in the read condition storage section, wherein the read condition setting section deletes the read condition stored in the read condition storage section and stores the initial condition into the read condition storage section when the elapsed time reaches a second predetermined time shorter than the first predetermined time.

Therefore, when the initial condition of the read condition is changed at the time of reading the source document in the continuous read mode, the condition can be held during the second predetermined time shorter than the first predetermined time. Accordingly, the user does not need to set the read condition every time the user performs the reading. In addition, the user does not need to restore the read condition to the initial condition after completing the reading.

In the image reading apparatus, the read condition is information regarding at least one of resolution, lightness, shade, color tone, magnification, document size and the number of documents to be read.

Therefore, the read condition can be selected from a plurality of parameters. Because the plurality of parameters can be changed respectively, convenience enhances.

In the image reading apparatus, the read mode switching section that switches from the continuous read mode to the ordinary read mode according to an operation by the user.

Therefore, the user can switch the read mode to the ordinary read mode manually after the last reading of the source document completes. Accordingly, even if the document cover is closed before the first predetermined time passes, it can be prevented from performing the reading. As a result, misoperation of the image reading apparatus can be prevented.

The invention provides a copying machine having: an image reading apparatus; and an image forming apparatus that forms an image formed on a source document and read by the image reading apparatus onto a recording medium, wherein the image reading apparatus involving: a read table on which a source document is mounted; a document cover held on the read table openably and closably with respect to the read table; and an opening/closing detection section that detects an opened state and a closed state of the document cover; a read mode switching section that switches between a continuous read mode and an ordinary read mode, the continuous read mode where an image formed on the source document is read when the opening/closing detection section detects the closed state of the document cover after detecting the opened state, the ordinary read mode where an image formed on the source document is read according to an instruction by a user of the image reading apparatus regardless of the opened state or the closed state of the document cover; a timer section that measures an elapsed time since the read mode switching section switches to the continuous read mode; and a reset section that resets the elapsed time when the opening/closing detection section detects the closed state of the document cover in the continuous read mode, wherein the read mode switching section switches from the continuous read mode to the ordinary read mode when the elapsed time reaches a first predetermined time.

Therefore, the source document can be copied simply when a series of operations for mounting a source document on the read table and closing the document cover are carried out. The user does not need to operate the image reading apparatus for starting the reading of the source document every time the source document is set. As a result, convenience enhances.

FIG. 4
27: OPENING/CLOSING SWITCH
50: OPERATION PORTION 52, 53, 54, 55, 56, 57, 58, 59, 60, 61: KEY
140: FLASH ROM

150: DISPLAY DRIVE PORTION
155: LED DRIVE PORTION
160: INPUT DETECTION PORTION
190: USB INTERFACE
170: SCANNER DRIVE PORTION
171: SCANNER PORTION
180: PRINTER DRIVE PORTION
181: PRINTER PORTION
200: MODEM
220: MEDIA DRIVE
221: MEMORY CARD
  FIG. 5
121: PROGRAM STORAGE AREA
122: FACTORY PRESET STORAGE AREA
  FIG. 6
131: WORK AREA
132: READ IMAGE DATA STORAGE AREA
133: PRINT IMAGE DATA STORAGE AREA
134: FLAG RELATION STORAGE AREA
135: TIMER RELATION STORAGE AREA
136: DIAL STORAGE AREA
137: TEMPORARY SETTING STORAGE AREA
  FIG. 8
S10: INITIALIZE SETTINGS
S11: SELECT FAX MODE
S12: DISPLAY CLOCK ON LCD
S13: ANY KEY INPUT?
S15: ANY EXTERNAL INPUT?
S16: EXTERNAL INPUT PROCESS
S17: COPY MODE KEY?
S18: COPY MODE PROCESS
S20: SCANNER MODE KEY?
S21: SCANNER MODE PROCESS
S22: COLOR START KEY?
S23: DIAL INPUT COMPLETED?
S25: COLOR FAX TRANSMISSION PROCESS
S26: MONOCHROME START KEY?
S27: DIAL INPUT COMPLETED?
S28: MONOCHROME FAX TRANSMISSION PROCESS
S30: NUMERIC KEYPAD?
S31: DISPLAY DIAL ON LCD
S32: ANOTHER KEY PROCESS
  FIG. 9
S50: COPY MODE INITIALIZATION PROCESS
S51: SELECT COPY MODE
S52: DISPLAY DEFAULT SETTINGS ON LCD
S53: START MODE SWITCHING TIMER
S57: KEY INPUT?
S58: SETTING HOLD TIMER OPERATING?
S59: SETTING HOLD TIME PASSED?
S60: RESTORE TO DEFAULT SETTINGS
S61: CONTINUOUS READ TIMER OPERATING?
S62: CONTINUOUS READ TIME PASSED?
S63: STORE "0" IN CONTINUOUS READ MODE FLAG
S65: MODE SWITCHING TIME PASSED?
S66: FAX MODE INITIALIZATION PROCESS
S67: SELECT FAX MODE
S68: DISPLAY MEASURED TIME ON LCD
S70: COLOR START KEY?
S71: MONOCHROME START KEY?
S72: MONOCHROME COPY PROCESS
S73: STORE "2" IN AUTO-MODE FLAG
S75: PROCESS ANOTHER KEY
S76: COVER CLOSED?
S77: OPENING/CLOSING FLAG IS "1"?
S78: STORE "1" IN OPENING/CLOSING FLAG
S80: OPENING/CLOSING FLAG IS "0"?
S81: STORE "0" IN OPENING/CLOSING FLAG
S82: AUTO-MODE FLAG IS "1"?
S83: AUTO-MODE FLAG IS "2"?
S85: MONOCHROME COPY PROCESS
S86: STORE "2" IN AUTO-MODE FLAG
S87: COLOR COPY PROCESS
S88: STORE "1" IN AUTO-MODE FLAG
S90: START MODE SWITCHING TIMER
S91: START CONTINUOUS READ TIMER
S92: START SETTING HOLD TIMER
S93: CONTINUOUS READ MODE FLAG IS "1"?
S95: STORE "0" IN AUTO-MODE FLAG
  FIG. 10
S100: POWER KEY?
S102: TERMINATION PROCESS
S103: SETTING KEY?
S105: SETTING PROCESS
S106: STOP KEY?
S107: RESTORE TO DEFAULT SETTINGS
S108: FAX MODE KEY?
S110: FAX MODE SHIFTING PROCESS
S111: SCANNER MODE KEY?
S112: SCANNER MODE SHIFTING PROCESS
S115: SETTING OF OPERATION MODE COMPLETED?
S116: SETTING OF CONTINUOUS READ MODE COMPLETED?
S117: STORE "0" IN CONTINUOUS READ MODE FLAG
S118: STORE "1" IN CONTINUOUS READ MODE FLAG

What is claimed is:

1. An image reading apparatus comprising:
a read table on which a source document is mounted;
a document cover held on the read table openably and closably with respect to the read table;
an opening/closing detection section that detects an opened state and a closed state of the document cover;
a read mode switching section that switches between a continuous read mode and an ordinary read mode;
an instruction receiving section that receives an instruction inputted by a user;
an image reading section that reads an image of the source document, wherein:
  in the ordinary read mode, the image reading section reads the image of the source document in response to the instruction received by the instruction receiving section and does not read the image in response to a change of the document cover from the open state to the closed state detected by the opening/closing detection section, and
  in the continuous read mode, the image reading section reads the image of the source document in response to the change of the document cover from the open state to the closed state detected by the opening/closing detection section;
a timer section that measures an elapsed time since the read mode switching section switches to the continuous read mode; and
a reset section that resets the elapsed time when the opening/closing detection section detects the closed state of the document cover in the continuous read mode,
wherein the read mode switching section switches from the continuous read mode to the ordinary read mode when the elapsed time reaches a first predetermined time.

2. The image reading apparatus according to claim 1, further comprising:
a read condition storage section that stores a read condition referred to when the source document is read;

an initial condition storage section that stores an initial condition of the read condition;

a read condition setting section that stores the initial condition stored in the initial condition storage section as the read condition into the read condition storage section; and a read condition changing section that changes the read condition stored in the read condition storage section, wherein the read condition setting section deletes the read condition stored in the read condition storage section and stores the initial condition into the read condition storage section when the elapsed time reaches a second predetermined time shorter than the first predetermined time.

3. The image reading apparatus according to claim 2, wherein the read condition is information regarding at least one of resolution, lightness, shade, color tone, magnification, document size and the number of documents to be read.

4. The image reading apparatus according to claim 1, wherein the read mode switching section that switches from the continuous read mode to the ordinary read mode according to an operation by the user.

5. A copying machine comprising:

an image reading apparatus; and an image forming apparatus that forms an image formed on a source document and read by the image reading apparatus onto a recording medium, wherein the image reading apparatus involving:

a read table on which a source document is mounted;

a document cover held on the read table openably and closably with respect to the read table; and an opening/closing detection section that detects an opened state and a closed state of the document cover;

a read mode switching section that switches between a continuous read mode and an ordinary read mode;

an instruction receiving section that receives an instruction inputted by a user;

an image reading section that reads an image of the source document, wherein:

in the ordinary read mode, the image reading section reads the image of the source document in response to the instruction received by the instruction receiving section and does not read the image in response to a change of the document cover from the open state to the closed state detected by the opening/closing detection section, and in the continuous read mode, the image reading section reads the image of the source document in response to the change of the document cover from the open state to the closed state detected by the opening/closing detection section;

a timer section that measures an elapsed time since the read mode switching section switches to the continuous read mode; and a reset section that resets the elapsed time when the opening/closing detection section detects the closed state of the document cover in the continuous read mode, wherein the read mode switching section switches from the continuous read mode to the ordinary read mode when the elapsed time reaches a first predetermined time.

* * * * *